United States Patent
Yu et al.

(10) Patent No.: US 10,896,446 B2
(45) Date of Patent: *Jan. 19, 2021

(54) LOCATION-BASED BID MODIFIERS

(71) Applicant: Google LLC, Mountain View, CA (US)

(72) Inventors: Zhou Yu, Sunnyvale, CA (US);
Dheeraj Ashok Motwani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 525 days.

This patent is subject to a terminal disclaimer.

(21) Appl. No.: 15/786,584

(22) Filed: Oct. 17, 2017

(65) Prior Publication Data

US 2018/0040034 A1 Feb. 8, 2018

Related U.S. Application Data

(63) Continuation of application No. 15/282,648, filed on Sep. 30, 2016, now Pat. No. 10,395,280, which is a continuation of application No. 14/055,523, filed on Oct. 16, 2013, now Pat. No. 9,489,692.

(51) Int. Cl.
| | | |
|---|---|---|
| *G06Q 30/00* | (2012.01) | |
| *G06Q 30/02* | (2012.01) | |
| *G06Q 30/08* | (2012.01) | |
| *G06N 7/00* | (2006.01) | |

(52) U.S. Cl.
CPC ......... *G06Q 30/0275* (2013.01); *G06N 7/005* (2013.01); *G06Q 30/0261* (2013.01); *G06Q 30/08* (2013.01)

(58) Field of Classification Search
CPC ........... G06Q 30/0275; G06Q 30/0261; G06Q 30/08; G06N 7/005

USPC .............................. 705/14.85, 14, 26, 27, 85
See application file for complete search history.

(56) References Cited

U.S. PATENT DOCUMENTS

| | | |
|---|---|---|
| 6,141,010 A | 10/2000 | Hoyle |
| 6,910,044 B2 | 6/2005 | Weinberg et al. |
| 7,231,358 B2 | 6/2007 | Singh et al. |
| 7,567,958 B1 | 7/2009 | Alspector et al. |
| 7,870,039 B1 | 1/2011 | Dom et al. |
| 7,908,238 B1 | 3/2011 | Nolet et al. |
| 7,921,052 B2 | 4/2011 | Dabney et al. |
| 8,175,914 B1 | 5/2012 | Benson et al. |
| 8,190,489 B2 | 5/2012 | Sandholm et al. |

(Continued)

OTHER PUBLICATIONS

U.S. Final Office Action on U.S. Appl. No. 15/282,648, dated Nov. 16, 2018, 8 pages.

(Continued)

*Primary Examiner* — Robert M Pond
(74) *Attorney, Agent, or Firm* — Foley & Lardner LLP; James De Vellis

(57) ABSTRACT

Systems and methods for determining location-based bid modifier suggestions include determining a content placement cost based in part on a likelihood of a user that has entered a physical establishment completing a transaction, an average transaction amount for the establishment, and an expected return on investment (ROI). A location-based bid modifier may be determined using the computed cost and a base bid amount. In some implementations, the location-based bid modifier may also be based on a probability model that models the probability of the user visiting the establishment.

20 Claims, 6 Drawing Sheets

(56) References Cited

U.S. PATENT DOCUMENTS

| | | |
|---|---|---|
| 8,204,818 B1 | 6/2012 | Aggarwal |
| 8,266,003 B1 | 9/2012 | Mirchandani et al. |
| 8,271,325 B2 | 9/2012 | Silverman et al. |
| 8,346,607 B1 | 1/2013 | Benson et al. |
| 8,433,611 B2 | 4/2013 | Lax et al. |
| 8,719,081 B1 | 5/2014 | Langrock et al. |
| 2003/0018501 A1 | 1/2003 | Shan |
| 2005/0027590 A9 | 2/2005 | Gailey et al. |
| 2005/0028188 A1 | 2/2005 | Latona et al. |
| 2005/0154637 A1 | 7/2005 | Nair et al. |
| 2005/0160002 A1 | 7/2005 | Roetter et al. |
| 2006/0041500 A1 | 2/2006 | Diana et al. |
| 2006/0069614 A1 | 3/2006 | Agarwal et al. |
| 2006/0184417 A1 | 8/2006 | Van Der Linden et al. |
| 2006/0224445 A1 | 10/2006 | Axe et al. |
| 2006/0224447 A1* | 10/2006 | Koningstein .......... G06Q 30/02 705/14.13 |
| 2007/0094072 A1 | 4/2007 | Vidals et al. |
| 2007/0162379 A1 | 7/2007 | Skinner |
| 2007/0265923 A1 | 11/2007 | Krassner et al. |
| 2007/0288317 A1 | 12/2007 | Gupta et al. |
| 2007/0294149 A1 | 12/2007 | Lu et al. |
| 2008/0140489 A1 | 6/2008 | Berkhin et al. |
| 2008/0275777 A1 | 11/2008 | Protheroe et al. |
| 2009/0006375 A1* | 1/2009 | Lax .......... G06Q 30/02 |
| 2009/0048908 A1 | 2/2009 | Kaplan et al. |
| 2009/0132353 A1 | 5/2009 | Maggenti et al. |
| 2009/0276329 A1 | 11/2009 | Sandholm et al. |
| 2010/0042421 A1 | 2/2010 | Bai et al. |
| 2010/0094712 A1 | 4/2010 | Lai |
| 2010/0138291 A1 | 6/2010 | Silverman et al. |
| 2010/0211460 A1* | 8/2010 | Agarwal .......... G06Q 30/02 705/14.46 |
| 2010/0223141 A1 | 9/2010 | Spencer et al. |
| 2011/0015994 A1 | 1/2011 | Ramer et al. |
| 2011/0035277 A1 | 2/2011 | Kodialam et al. |
| 2011/0040616 A1 | 2/2011 | Kannan et al. |
| 2011/0071879 A1 | 3/2011 | Flockhart et al. |
| 2011/0071900 A1 | 3/2011 | Kamath et al. |
| 2011/0078000 A1 | 3/2011 | Ma et al. |
| 2011/0179033 A1 | 7/2011 | Mount et al. |
| 2011/0231264 A1 | 9/2011 | Dilling et al. |
| 2011/0231296 A1 | 9/2011 | Gross et al. |
| 2011/0238487 A1 | 9/2011 | Chang et al. |
| 2011/0258049 A1 | 10/2011 | Ramer et al. |
| 2011/0264516 A1 | 10/2011 | Lang et al. |
| 2011/0270673 A1 | 11/2011 | Lin et al. |
| 2012/0036024 A1 | 2/2012 | Mysen et al. |
| 2012/0041816 A1 | 2/2012 | Buchalter |
| 2012/0066065 A1* | 3/2012 | Switzer .......... G06Q 20/10 705/14.53 |
| 2012/0123856 A1 | 5/2012 | Paunikar et al. |
| 2012/0166452 A1 | 6/2012 | Tseng |
| 2012/0245990 A1* | 9/2012 | Agarwal .......... G06Q 30/0202 705/14.25 |
| 2012/0310729 A1 | 12/2012 | Dalto et al. |
| 2013/0018722 A1 | 1/2013 | Libby |
| 2013/0091019 A1 | 4/2013 | Mallon et al. |
| 2013/0159092 A1 | 6/2013 | Lahaie et al. |
| 2013/0204664 A1 | 8/2013 | Romagnolo et al. |
| 2013/0212108 A1 | 8/2013 | Armon-Kest et al. |
| 2013/0212608 A1 | 8/2013 | Cansler et al. |
| 2013/0238762 A1 | 9/2013 | Raleigh et al. |
| 2013/0339126 A1 | 12/2013 | Cui et al. |
| 2014/0006170 A1 | 1/2014 | Collette et al. |
| 2014/0100944 A1 | 4/2014 | Zhu et al. |
| 2014/0122221 A1 | 5/2014 | Jordan et al. |
| 2014/0122253 A1 | 5/2014 | Vassilvitskii et al. |
| 2014/0129351 A1 | 5/2014 | Ringdahl |
| 2014/0222587 A1 | 8/2014 | Feldman et al. |
| 2014/0278855 A1 | 9/2014 | Clark et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0358301 A1 | 12/2017 | Raitio et al. |

OTHER PUBLICATIONS

U.S. Final Office Action on U.S. Appl. No. 15/360,365, dated Aug. 13, 2018, 11 pages.

U.S. Final Office Action on U.S. Appl. No. 15/360,365, dated Jun. 13, 2019, 14 pages.

U.S. Non-Final Office Action on U.S. Appl. No. 15/360,365, dated Feb. 11, 2019, 11 pages.

U.S. Notice of Allowance on U.S. Appl. No. 15/282,648, dated Apr. 12, 2019, 9 pages.

Notice of Allowance on U.S. Appl. No. 15/360,365 dated Nov. 4, 2019 (12 pages).

"Walmart and Google to offer voice-enabled shopping", BBC News, Aug. 23, 2017 (10 pages).

Abrams, Help users find, interact & re-engage with your app on the Google Assistant, Google Developers Blog, Nov. 15, 2017, 16 pages.

Ackley, M., "4 paid search strategies to advertise your entire product catalog," http://searchengineland.com/4-paid-search-strategies-to-successfully-advertise-your-entire-product-catalog-172424, Sep. 26, 2013, page accessed Oct. 17, 2013, 3 pages.

Albrecht, "Alexa, How Can You Be Used in Restaurants?", the spoon, Dec. 10, 2017, 6 pages.

Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

AW4P: Internet Marketing & SEO Blog, printed from Internet address: http://aw4p.blogspot.com/2007/03/little-known-adwords-features-bid.html, Mar. 17, 2007, 5 pages.

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018, 6 pages.

Chen, Lulu Yilun, "Alibaba Challenges Google, Amazon With New Echo-Like Device", Bloomberg Technology, Jul. 5, 2017 (3 pages).

Churchill, Christine, "Best Practices for Google Enhanced PPC Campaigns", Jun. 19, 2013; Internet address: http://searchengineland.com/highlights-of-the-smx-advanced-session-on-ppc-enhanced-campaigns. 6 pages.

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Crist, Ry, "Logitech Harmony's Alexa Skill just got a whole lot better", cnet, Jul. 13, 2017 (2 pages).

Dent, A., "Product listing ads: How to maximize your returns," http://searchenginewatch.com/article/2263233/Product-Listing-Ads-How-to-Maximize-Your-Returns, Apr. 23, 2013, page accessed Oct. 17, 2013, 3 pages.

Estes, "Amazon's Newest Gadget Is a Tablet That's Also an Echo", Gizmodo, Sep. 19, 2017, 3 pages.

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

Forrest, Conner, "Essential Home wants to be bridge between Amazon's Alexa, Apple's Siri, and Google Assistant", TechRepublic, May 31, 2017 (10 pages).

(56) References Cited

OTHER PUBLICATIONS

Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . .'", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Help, "Understanding bidding basics." https://support.google.com/adwords/answer/2459326?hl=en, page accessed Jul. 23, 2014, 3 pages.
Google Help, Target Ads to Geographic Locations—AdWords Help, printed from Internet address: https://support.google.com/adwords/answer/1722043?hl=en on Jul. 23, 2014, 7 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Google Inc., Target CPA Bidding: A New Way to Meet your ROI Goals with Conversion Optimizer, dated May 3, 2010, printed from Internet address: www.adwords.blogspot.com/2010/05/target-cpa-bidding-new-way-to-meet-your.html on Apr. 12, 2013, 2 pages.
Google Inc., Using Custom Scheduling, printed from Internet address: http://www.support.google.com/adwords/answer/2404244/?hl=en on Jan. 23, 2013, 6 pages.
Google, Inc., About Conversion Optimizer, printed from Internet address: www.support.google.com/adwords/answer/2471188?hl=en on Apr. 12, 2013, 4 pages.
Google, Inc., AdWords Help: Why Costs Might Exceed Your Daily Budget, printed from Internet address: http://support.google.com/adwords/answer/2375423?hl=en on Mar. 21, 2013, 3 pages.
Google, Inc., Enter Experimental Bids in AdWords Editor, printed from Internet address: http://support.google.com/adwords/editor/answer/1399246?hl=en on Jan. 23, 2013, 2 pages.
Google, Inc., Google Plans to Combine Mobile & Desktop Ads $2013 Search Engine Watch (#SEW), printed from Internet address: http://searchenginewatch.com/article/2219061/Google-Plans-to-Combine-Mobile-Desktop, Oct. 22, 2012; 3 pages.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Preliminary Report on Patentability for PCT Application No. PCT/US2013/073328 dated Aug. 20, 2015, 6 pages.
International Search Report and Written Opinion dated Mar. 26, 2014, for PCT Application No. PCT/US2013/073328, 12 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Marin Software, ROI-Based Campaign Management: Optimization Beyond Bidding, White Paper, Oct. 2009, 16 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
U.S. Corrected Notice of Allowance for U.S. Appl. No. 13/875,967 dated Feb. 8, 2017, 2 pages.
U.S. Notice of Allowance for U.S. Appl. No. 13/875,967 dated Jan. 23, 2017, 10 pages.
U.S. Notice of Allowance for U.S. Appl. No. 14/055,523 dated Jul. 6, 2016, 13 pages.
U.S. Notice of Allowance for U.S. Appl. No. 14/073,086 dated Dec. 16, 2015, 8 pages.
U.S. Notice of Allowance for U.S. Appl. No. 14/106,395 dated Sep. 24, 2014, 8 pages.
U.S. Office Action for U.S. Appl. No. 13/797,597 dated Sep. 8, 2015, 12 pages.
U.S. Office Action for U.S. Appl. No. 13/875,967 dated Jan. 15, 2015, 37 pages.
U.S. Office Action for U.S. Appl. No. 13/875,967 dated May 16, 2016, 8 pages.
U.S. Office Action for U.S. Appl. No. 13/875,967 dated Sep. 16, 2015, 49 pages.

(56) References Cited

OTHER PUBLICATIONS

U.S. Office Action for U.S. Appl. No. 13/875,967 dated Sep. 19, 2016, 9 pages.
U.S. Office Action for U.S. Appl. No. 13/911,898 dated Oct. 23,2015, 9 pages.
U.S. Office Action for U.S. Appl. No. 14/049,889 dated Sep. 2, 2014, 20 pages.
U.S. Office Action for U.S. Appl. No. 14/055,523 dated Dec. 18, 2015, 16 pages.
U.S. Office Action for U.S. Appl. No. 14/055,523 dated May 7, 2015, 14 pages.
U.S. Office Action for U.S. Appl. No. 14/055,523 dated Oct. 20, 2014, 25 pages.
U.S. Office Action for U.S. Appl. No. 14/073,086 dated Aug. 10, 2016, 12 pages.
U.S. Office Action for U.S. Appl. No. 14/073,086 dated Jan. 8, 2015, 12 pages.
U.S. Office Action for U.S. Appl. No. 14/073,086 dated Jun. 1, 2015, 11 pages.
U.S. Office Action for U.S. Appl. No. 14/106,395 dated Mar. 26, 2014, 11 pages.
U.S. Office Action for U.S. Appl. No. 14/106,401 dated Mar. 25, 2016, 14 pages.
U.S. Office Action for U.S. Appl. No. 14/106,412 dated Mar. 24, 2016, 12 pages.
U.S. Office Action for U.S. Appl. No. 15/282,648 dated Apr. 20, 2018, 12 pages.
U.S. Office Action for U.S. Appl. No. 15/360,365 dated Mar. 8, 2018, 14 pages.
U.S. Office Action on U.S. Appl. No. 14/049,889 dated Mar. 12, 2014, 25 pages.
U.S. Office Action on U.S. Appl. No. 14/055,523 dated Feb. 10, 2014, 17 pages.
Vigneron, Benjamin, How to Determine Your Mobile & Geo Bid Multipliers for Enhanced Campaigns, Mar. 22, 2013, 7 pages.
Willens, Max, "For publishers, Amazon Alexa holds promise but not much money (yet)", Digiday, Jul. 6, 2017 (6 pages).
Notice of Allowance for U.S. Appl. No. 15/360,365 dated Nov. 26, 2019 (7 pages).

* cited by examiner

Adjust your bids for location

Enter your retail location(s): [3 Main St., Anywhere USA] — 602

Enter your average transaction amount: [$5] — 604

Enter your expected ROI: [$4] — 610

Enter the average percentage of your customers that complete a transaction: [90%] — 606

Enter the maximum amount someone would travel to your location: [10] [Miles ▽] — 612, 614

Enter your base bid amount: [$1] — 608

Based on your inputs, we recommend the following bid modifiers:

[Calculate] — 618

| Bid Modifier | Distance R |
|---|---|
| +12.5% | 0 mi. ≤ R ≤ 1 mi. |
| +10% | 1 mi. < R ≤ 2 mi. |
| +6% | 2 mi. < R ≤ 4 mi. |
| +4.375% | 4 mi. < R ≤ 6 mi. |
| +1.25% | 6 < R ≤ 10 mi. |
| +0.00% | 10 mi. < R |

LOCATION-BASED BID MODIFIERS

CROSS-REFERENCES TO RELATED APPLICATIONS

This application claims the benefit of priority under 35 U.S.C. § 120 as a continuation of Ser. No. 15/282,648, titled "Location-Based Bid Modifiers" and filed Sep. 30, 2016, which claims the benefit of priority under 35 U.S.C. § 120 as a continuation of U.S. patent application Ser. No. 14/055,523, titled "Location-Based Bid Modifiers" and filed Oct. 16, 2013, each of which are hereby incorporated by reference herein in their entirety.

BACKGROUND

Online content may be received from various first-party or third-party sources. In general, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game). More generally, a first-party content provider may be any content provider that allows another content provider (i.e., a third-party content provider) to provide content in conjunction with that of the first-party.

SUMMARY

One implementation is a method of suggesting an auction bid modifier. The method includes receiving, at the one or more processors, data indicative of the likelihood of a user that has entered a physical establishment completing a transaction. The method also includes receiving, at the one or more processors, data indicative of an average transaction amount for the establishment. The method further includes receiving, at the one or more processors, data indicative of an expected return on investment (ROI) for a transaction made at the establishment that resulted from the placement of third-party content. The method additionally includes receiving, at the one or more processors, a base bid amount for a content auction. The method also includes calculating, by the one or more processors, a content placement cost associated with an average transaction for the establishment using the average transaction amount for the establishment, the expected ROI for a transaction, and the likelihood of a user that has entered the establishment completing a transaction. The method yet further includes determining an auction bid modifier using the base bid amount and the calculated content placement cost. The method also includes providing the auction bid modifier for display.

Another implementation is a system for suggesting an auction bid modifier that includes one or more processors. The one or more processors are operable to receive data indicative of the likelihood of a user that has entered a physical establishment completing a transaction. The one or more processors are also operable to receive data indicative of an average transaction amount for the establishment. The one or more processors are further operable to receive data indicative of an expected return on investment (ROI) for a transaction made at the establishment that resulted from the placement of third-party content. The one or more processors are yet further operable to receive a base bid amount for a content auction. The one or more processors are additionally operable to calculate a content placement cost associated with an average transaction for the establishment using the average transaction amount for the establishment, the expected ROI for a transaction, and the likelihood of a user that has entered the establishment completing a transaction. The one or more processors are also operable to determine an auction bid modifier using the base bid amount and the calculated content placement cost. The one or more processors are additionally operable to provide the auction bid modifier for display.

A further implementation is a computer-readable storage medium having machine instructions stored therein that are executable by one or more processors and cause the one or more processors to perform operations. The operations include receiving data indicative of the likelihood of a user that has entered a physical establishment completing a transaction. The operations also include receiving data indicative of an average transaction amount for the establishment. The operations further include receiving data indicative of an expected return on investment (ROI) for a transaction made at the establishment that resulted from the placement of third-party content. The operations additionally include receiving a base bid amount for a content auction. The operations also include calculating a content placement cost associated with an average transaction for the establishment using the average transaction amount for the establishment, the expected ROI for a transaction, and the likelihood of a user that has entered the establishment completing a transaction. The operations yet further include determining an auction bid modifier using the base bid amount and the calculated content placement cost. The operations also include providing the auction bid modifier for display.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 6 is an illustration of one implementation of an electronic display presenting a suggested bid modifier.

DETAILED DESCRIPTION

Figure 1:
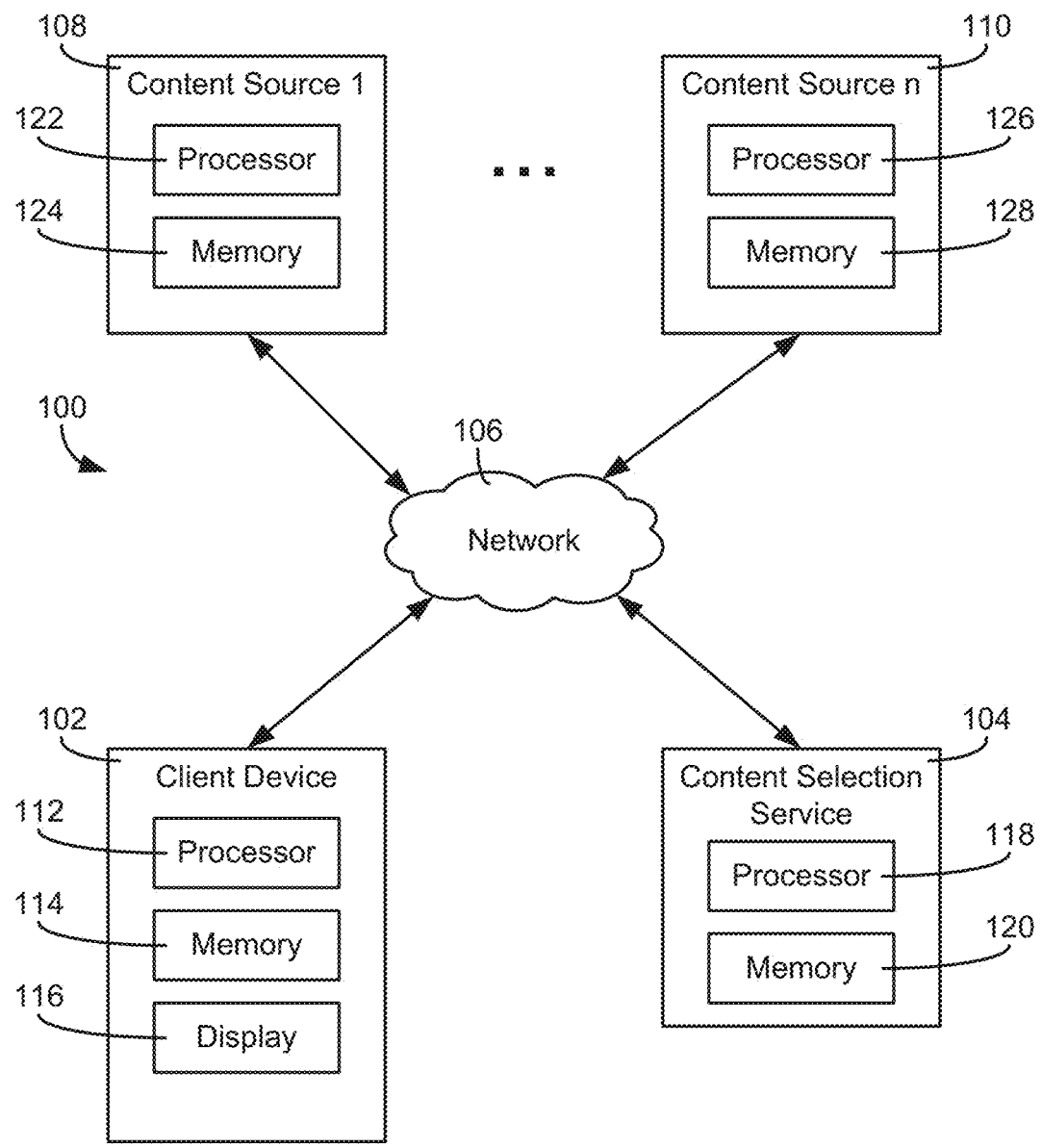
FIG. 1 is a block diagram of one implementation of a computer system.

According to some aspects of the present disclosure, a first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different third-party content during different visits to the webpage. The content selection service may determine which third-party content is to be provided based on any number of factors (e.g., whether the third-party content and first-party content relate to the same topic). For example, a third-party advertisement for golf clubs may appear on a webpage devoted to reviews of golf resorts. The content selection service may also conduct a content auction to select the third-party content to be provided from among the various third-party content providers.

In some cases, third-party content selected by a content selection service may be interactive. For example, the third-party content may be a playable video or audio file. In another example, the third-party content may be a clickable image (e.g., a hotlinked image) or hotlink configured to direct a web browser to an associated webpage when the image or hotlink is selected. In response to an interaction with the third-party content at a client device, the content selection service may receive an indication of the interaction. For example, the content selection service may receive an indication that a device clicked on a third-party image and was redirected to the third-party content provider's website.

A content selection service may use data indicative of interactions with third-party content in a number of ways. The content selection service may allow third-party content providers to bid in an auction based on whether a user interacts with the selected content. For example, a third-party content provider may place a bid in the auction that corresponds to an agreement to pay a certain amount of money if a user interacts with the provider's content (e.g., the provider may agree to pay $3 if the user clicks on the provider's content). The content selection service may also use content interaction data to determine the performance of the first-party provider's content. For example, users may be more inclined to click on third-party content on certain webpages over others. Auction bids to place third-party content may be higher for high-performing websites, while the bids may be lower for low-performing websites.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by a content selection service and presented to the user. Certain data, such as a device identifier, may be anonymized in one or more ways before it is stored or used, so that personally identifiable information is removed when generating parameters (e.g., demographic parameters) used by the content selection service to select third-party content. For example, a device identifier may be anonymized so that no personally identifiable information about its corresponding user can be determined from it. In another example, a user's geographic location may be generalized where location information is obtained (such as to a city, ZIP code, or state level), so that a precise location of the user cannot be determined. Thus, the user may have control over how information is collected about him or her and used by the content selection service.

In some implementations, a content selection service may be configured to allow a third-party content provider to create one or more campaigns, such as an advertising campaign. As part of a campaign, the third-party content provider may set any number of parameters that control how and when the third-party content provider participates in a content auction. For example, a campaign may include a bid amount on behalf of the content provider for use in a content auction. Other parameters may include selection parameters that control when the bid amount is used (e.g., whether or not the third-party content provider participates in a particular content auction). Selection parameters may include, but are not limited to, a set of one or more search keywords, a topical category, a geographic location of the client device on which the third-party content will be presented, or the type of client device on which the third-party content will be presented.

According to various implementations, a content selection service may suggest a bid amount to a third-party content provider that uses location-based selection parameters in content auctions. In some implementations, the suggested bid amount may be a bid modifier value that adjusts the auction bids of the provider based on the location of the client device. For example, the content selection service may suggest that an advertiser bid 25% more than his or her base bid if the device that would receive the advertisement is located within a mile of the advertiser's retail establishment. In various implementations, the suggested bid modifier value may be based on certain information received by the content selection service. For example, the suggested bid modifier may be based in part on the likelihood of a patron completing a transaction after entering the physical establishment of the content provider, the average amount of a completed transaction in the establishment, the base bid amount used by the content provider, and/or the expected return on investment (ROI) of the content provider. In further implementations, the content selection service may generate multiple bid modifiers based on a probability of a user visiting the establishment of the third-party content provider. For example, the content selection service may generate a suggested bid modifier of +25% to an advertiser's base bid if the client device is located within one mile of the establishment, a bid modifier of +20% if the client device is located between one and five miles of the establishment, etc.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content sources 108, 110 (e.g., a first content source through nth content source). Content sources 108, 110 may provide webpage data and/or other content, such as images, video, and audio, to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as being a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, application specific integrated circuits (ASICs), field programmable gate arrays (FPGAs), other forms of processing circuitry, or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, memory 124 of content source 108 may include instructions such as web server software, FTP serving software, and other types of software that cause content source 108 to provide content via network 106.

According to various implementations, content sources 108, 110 may provide webpage data to client device 102 that includes one or more content tags (e.g., one or more scripts or other instructions included in the webpage data). In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. For example, content source 108 may provide webpage data that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108, 110.

Content selection service 104 may also be one or more electronic devices connected to network 106. Content selection service 104 may be a computer server (e.g., an FTP server, a file sharing server, a web server, etc.) or a combination of servers (e.g., a data center, a cloud computing platform, etc.). Content selection service 104 may have a processor 118 and a memory 120 that stores program instructions executable by processor 118. In various cases, processor 118 may represent a single processor or a combination of processors in electronic communication with one another. Similarly, memory 120 may represent a single memory device or a combination of memory devices in communication with processor 118.

Content selection service 104 may be configured to select third-party content for client device 102 (i.e., content selection service 104 may provide a third-party content selection service). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108, 110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage being visited by client device 102 or within a first-party application being executed by client device 102 (e.g., within a game, messenger application, etc.).

In some implementations, content selection service 104 may be configured to select content based on a device identifier associated with client device 102. In general, a device identifier refers to any form of data that may be used to represent a device or a piece of software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, mobile device identifiers, international mobile station equipment identity (IMEI) numbers, media access control (MAC) addresses, telephone numbers, other hardware or software-based numbers, user profile data, network addresses, combinations thereof, and identifiers derived therefrom. For example, a cookie set on client device 102 may be used to identify client device 102 to content selection service 104 within a web browser application on client device 102.

Content selection service 104 may be configured to allow the user of client device 102 to control which information about the user is collected and used by content selection service 104 via a device identifier. In addition, to the extent that content selection service 104 does collect and use information about the user, the data may be anonymized such that the user's identity cannot be determined by analyzing the collected data. In other words, the user of client device 102 may control what types of information about the user is collected by content selection service 104 and how the information is used. In one implementation, the user of client device 102 may set one or more preferences (e.g., as part of an online profile) that control how content selection service 104 collects and uses information about the user. In another implementation, content selection service 104 may set a cookie or other device identifier on client device 102 that signifies that the user of client device 102 has elected not to allow content selection service 104 to store information regarding him or her.

If the user of client device 102 has elected to allow content selection service 104 to use information regarding himself or herself, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select third-party content to be provided as part of a first-party webpage or in conjunction with search results from one of content sources 108, 110.

Content selection service 104 may analyze the history data associated with a device identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of /Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the webpage being loaded, the referring webpage, etc.). For example, content selection service 104 may receive and store history data regarding whether or not third-party content provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108, 110. For example, content source 108 may store history data regarding web transactions with client device 102 and provide the history data to content selection service 104.

Content selection service 104 may apply one or more weightings to an interest or product category, to determine whether the category is to be associated with a device identifier. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

With the user's permission, content selection service 104 may receive location information from client device 102. The location information may be determined by client device 102 itself, by content selection service 104, or by another device on network 106. In some cases, client device 102 may include location-determining hardware, such as a global positioning system (GPS) receiver. In further cases, client device 102 may utilize triangulation or another technique to determine its location using network signals received by client device 102 (e.g., cellular signals, etc.). In some cases, client device 102, content selection service 104, or another device may determine the location of client device 102 based on a network access point used by client device 102. For example, if client device 102 accesses network 106 via a WiFi hotspot associated with a particular coffee shop, any of the devices in system 100 may use this information to determine that the location of client device 102 is in or near the coffee shop. In some implementations, a content tag of a webpage (e.g., an embedded webpage script) may cause client device 102 to report its location to content selection service. In further implementations, a stand-alone application (e.g., a mobile application) executed by client device 102 may report the location of client device 102 to content selection service 104.

If the user of client device 102 has elected to share location information with content selection service 104, content selection service 104 may use this information to select third-party content for client device 102. For example, content selection service 104 may provide an advertisement to client device 102 that alerts the user to a sale at a nearby retail establishment. Thus, content selection service 104 may use the location of client device 102 to select third-party content that may be relevant to the user's current location. After use, content selection service 104 may delete the location information or may flag the location information as ineligible for future use (e.g., content selection service 104 may only base the content selection on the current location of the device and not on a stored history of locations), to ensure the privacy of a user.

Content selection service 104 may be configured to conduct a content auction among third-party content providers to determine which third-party content is to be provided to client device 102. For example, content selection service 104 may conduct a real-time content auction in response to client device 102 requesting first-party content from one of content sources 108, 110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow third-party content providers to specify parameters as part of an account to control how and when the provider participates in content auctions. An account of a provider may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client device 102. In other words, the bid amount may be on a cost per impression or cost per thousand impressions (CPM) basis. In further cases, a bid amount may correspond to a specified action being performed in response to the third-party content being presented at a client device. For example, a bid amount may be a monetary amount that the third-party content provider is willing to pay, should their content be clicked on at the client device, thereby redirecting the client device to the provider's webpage. In other words, a bid amount may be a cost per click (CPC) bid amount. In another example, the bid amount may correspond to an action being performed on the third-party provider's website, such as the user of client device 102 making a purchase. Such bids are typically referred to as being on a cost per acquisition (CPA) or cost per conversion basis.

An account created via content selection service 104 may also include selection parameters that control when a bid is placed on behalf of a third-party content provider in a content auction. If the third-party content is to be presented in conjunction with search results from a search engine, for example, the selection parameters may include one or more sets of search keywords. For example, the third-party content provider may only participate in content auctions in which a search query for "golf resorts in California" is sent to a search engine. Other parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of an particular online newspaper.

In various implementations, content selection service 104 may be configured to suggest a location-based bid modifier to a third-party content provider. In general, a bid modifier refers to any adjustment value used by content selection service 104 to adjust an auction bid of a third-party content provider based on the location of the device to which the provider may send content. The bid modifier may be, for example, a percentage or dollar amount adjustment to the base auction bid of the content provider. In some cases, content selection service 104 may present a bid modifier as part of a finalized bid amount (e.g., the service may present the modified bid amount to the provider). For example, content selection service 104 may suggest that a third-party advertiser increase his or her auction bids by 75% for devices that are located within a certain range to the physical store of the advertiser. In some implementations, a location-based bid modifier may be used in conjunction with another location-based auction parameter. For example, one auction parameter may control whether or not the provider even places a bid in a content auction (e.g., no bid may be submitted if the subject client device is outside of a predefined range to the provider's establishment), while a bid modifier value may control the submitted auction bid when the device is within the defined range. For example, an advertiser may specify to content selection service 104 that he does not want to advertise to users that are located more than one hundred miles outside of San Francisco and may use a location-based bid modifier to increase his auction bids if a given user is within one mile of the advertiser's restaurant.

Content selection service 104 may determine a location-based bid modifier using information received about the business of a third-party content provider. The received information may include, for example, data indicative of the physical location of the provider's establishment, the average transaction amount at the establishment, the likelihood of a visitor to the establishment completing a transaction, and/or the expected ROI of the provider from placing advertisements. In one implementation, content selection service 104 may calculate a location-based bid modifier based on the following calculations:

$$ROI = \frac{\text{Expected\_Revenues}}{\text{Cost}} = \frac{A*p}{\text{Cost}}$$

where A is the average transaction amount for the content provider's establishment, p is the probability of a visitor to the establishment completing a transaction, ROI is the expected ROI of the provider by placing an advertisement, Expected Revenues refers to the expected transaction amount of an average visitor to the establishment, and Cost is the final cost of the advertisement to the provider. The cost of a content placement may be defined as follows:

$$\text{Cost} = (1+\beta)\text{Bid}$$

where Bid is the base auction bid used by the content provider (e.g., an auction bid that the provider wishes to use when a device is outside of a given range to the provider's establishment) and β is a location-based bid modifier value. Thus:

$$ROI = \frac{A*p}{(1+\beta)\text{Bid}}$$

which gives the following calculation for the bid modifier (β) that may be used by content selection service 104:

$$\beta = \frac{A*p}{ROI*\text{Bid}} - 1.$$

Content selection service 104 may present the calculated bid modifier to the third-party content provider as a suggestion (e.g., the provider may elect or decline the use of the suggested bid modifier). In some case, the calculated bid modifier may be suggested as part of a finalized bid amount. For example, instead of suggesting that a provider increase his or her base bid of $1 by 50%, content selection service 104 may alternatively suggest an increased bid amount of $1.50.

In some implementations, content selection service 104 may take into account the likelihood of a user visiting a physical establishment when calculating a suggested bid modifier. For example, content selection service 104 may use the above calculation for the bid modifier (β) if there is a 100% probability of the user of client device 102 visiting the establishment of the third-party content provider (e.g., the location of client device 102 corresponds to the location of the establishment). However, as the user's location begins to differ from that of the establishment, the likelihood of the user visiting the establishment may also decrease. In one implementation, content selection service 104 may calculate one or more bid modifiers as a function of a travel value (r) as follows:

$$BidM(r) = P(r)\beta = P(r)*\left[\frac{A*p}{ROI*\text{Bid}} - 1\right]$$

where BidM(r) is the bid modifier as a function of a travel value r. In general, a travel value may be any value that represents spatio-temporal relationship between the location of a client device and a physical establishment of a third-party content provider. In various implementations, the travel value may correspond to a direct distance between the establishment and the client device (e.g., measured as the crow flies), a travel distance between the client device and the establishment (e.g., the distance along a path that may be traveled by the client device to arrive at the establishment), an estimated travel time, or any other measure quantifying a relationship between the location of a client device and the location of an establishment of a third-party content provider.

Content selection service 104 may request information regarding the maximum travel value associated with the establishment of a third-party content provider. In other words, content selection service 104 may prompt a third-party content provider for the maximum distance or time that a potential customer would be willing to travel to the provider's establishment. For example, a potential customer of a build-it-yourself furniture outlet may be willing to travel up to sixty miles to visit the outlet, whereas a potential customer of a fast food restaurant may be willing to travel ten miles at maximum.

In various implementations, content selection service 104 may determine the probability of a user visiting the physical establishment of a third-party content provider as a decay function. For example, content selection service 104 may model the probability of the user visiting the establishment based on the maximum travel value specified by the third-party content provider. In one example, content selection service 104 may calculate a probability (P) of a visit as follows:

$$P(r) = e^{\lambda r}$$

where r represents the travel value associated with the establishment and λ is an unknown parameter. In other words, content selection service 104 may model the probability of a visit to the location as an exponential decay function, in some implementations. To determine the value of λ for the model, content selection service 104 may assign a minimum probability to the specified maximum travel value. For example, assume that the probability of a user outside of the specified range of 10 miles visiting the establishment is 5%. In such a case, content selection service 104 may solve the exponential decay function at this travel value to determine the value of λ. For example, content selection service may calculate the following:

$$P(r) = P(10) = 0.05 = e^{-\lambda 10}$$

$$\lambda = -\frac{\ln(0.05)}{10} \approx 0.29957.$$

Content selection service 104 may use the determined value of λ to calculate the probability of a user visiting the establishment from any location relative to the establishment. In some implementations, content selection service 104 may use a discrete function to model the probability of a visit to the establishment. For example, content selection service 104 may determine the travel values corresponding to the 95%, 80%, 65%, 50%, 35%, 20%, and 5% probabilities of a visit and use these to determine ranges of travel values. In one example, users located within one mile of the establishment may be assigned a 95% probability of visiting the establishment, users located between one and five miles of the establishment may be assigned an 80% probability of visiting the establishment, etc.

Content selection service 104 may provide one or more bid modifier values to a device associated with a third-party content provider as suggestions. For example, content selection service 104 may suggest the maximum bid modifier given the provider's responses and adjust the bid modifier downward for client devices located outside of a certain distance range (e.g., devices located within one mile of the provider's establishment may receive the maximum adjusted auction bid). In another example, content selection service 104 may present multiple bid adjustment values corresponding to different travel value ranges for review by the third-party content provider. In one implementation, content selection service 104 may automatically assign the generated bid adjustment value to the account of the third-party content provider.

In one example, assume that a third-party content provider specifies to content selection service 104 that a prospective customer is typically willing to travel up to sixty miles to visit the provider's physical store. In such a case, content selection service may assign a minimum probability of a visit to this distance. For example, content selection service 104 may assign a minimum probability of a visit to the store of 5% if a device is located sixty or more miles from the store. Content selection service 104 may also use these values to model the probability of a visit if a device is located within sixty miles of the store. For example, content selection service may calculate an exponential decay function as follows:

$$P(dist_{max}) = e^{-\lambda * dist_{max}} = P(60) = e^{-\lambda * 60} = 5\%$$

where $dist_{max}$ is the maximum distance specified by the content provider and 5% is the minimum probability of a visit to the store as a function. Solving for λ gives the following:

$$\lambda = -\frac{\ln(0.05)}{60} \approx 0.499$$

Content selection service 104 may then use λ to model the probability of a store visit by a user that is closest to the store and to calculate a bid modifier BidM as a function of distance r as follows:

$$BidM(r) = \beta^* P(r) = \beta^* e^{-\lambda r} = \beta^* e^{-r*0.499}$$

where β* is the bid modifier for a device that is within the closest distance to the store. Content selection service 104 may solve for β* as follows:

$$\beta^* = \left[\frac{A*p}{ROI*Bid} - 1\right]$$

where A is the average transaction amount for the content provider's store, p is the probability of a visitor to the establishment completing a transaction, ROI is the expected ROI of the provider by placing an advertisement, and Bid refers to the base bid used by the provider. In other words, the bid modifier β* may represent the percentage increase to the provider's base bid amount for a device that has the highest probability of visiting the provider's store. Continuing the example, content selection service 104 may discretize the exponential decay function to generate discrete bid modifiers based on a device's distance to the provider's store. For example, with a maximum distance of sixty miles and λ=0.499 as calculated above, content selection service may calculate the following bid modifiers:

$BidM(r)\beta^*$ if $0 < r \leq 1$ $BidM(r) = 0.8\beta^*$ if $1 < r \leq 4$ $BidM(r) = 0.65\beta^*$ if $4 < r \leq 9$ $BidM(r) = 0.5\beta^*$ if $9 < r \leq 14$ $BidM(r) = 0.35\beta^*$ if $14 < r \leq 21$ $BidM(r) = 0.2\beta^*$ if $21 < r \leq 32$ $BidM(r) = 0.15\beta^*$ if $32 < r \leq 60$ $BidM(r) = 0$ if $60 < r$ Thus, if client device 102 is located within a particular distance to the location of the provider's store, content selection service 104 may adjust the provider's bid amounts upwards using one of the bid modifiers calculated above.

Figure 2:
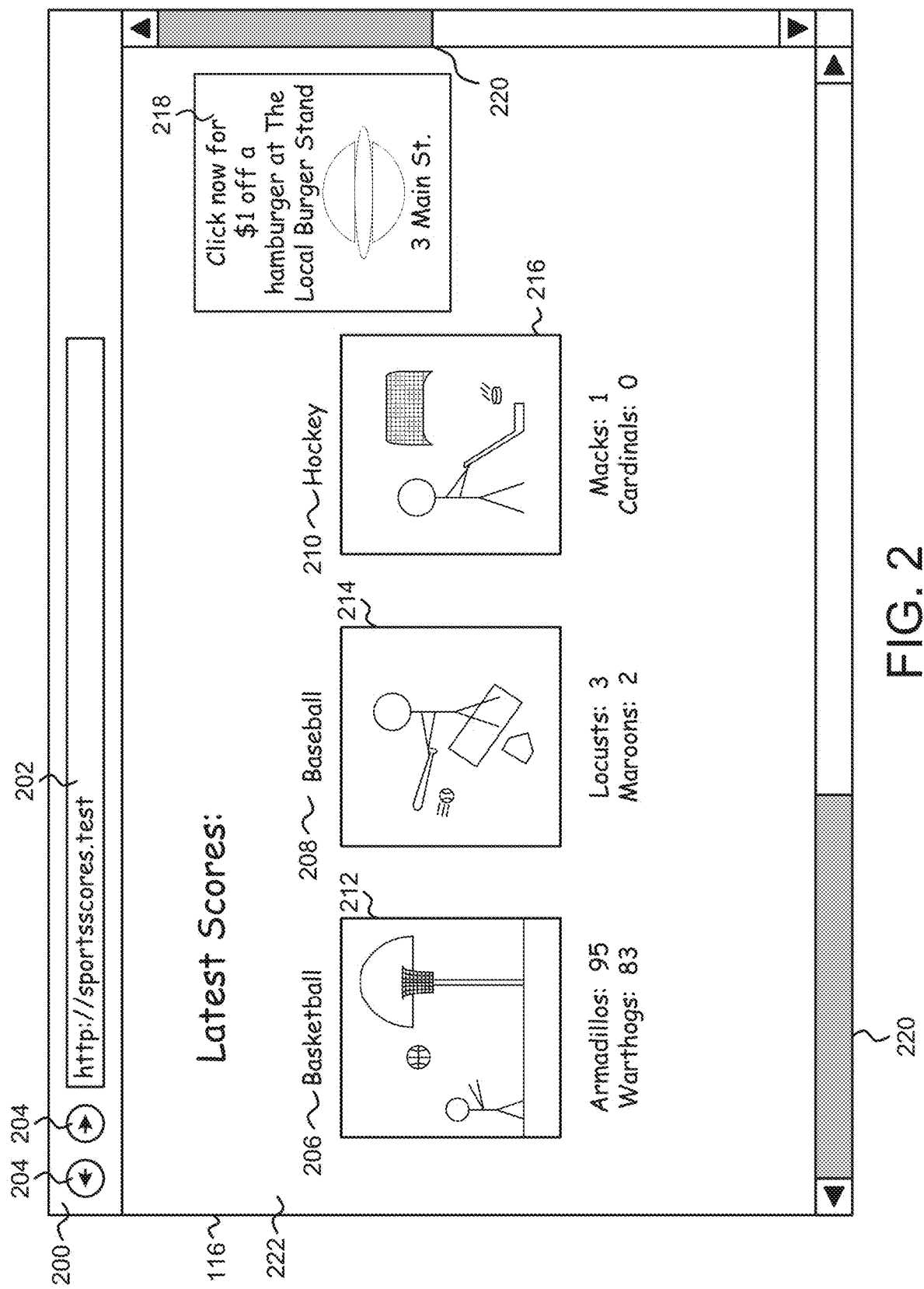
FIG. 2 is an illustration of an electronic display showing an example first-party webpage having third-party content.

Referring now to FIG. 2, an illustration is shown of electronic display 116 displaying an example first-party webpage 206. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of first-party webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "weather.html" provided by the website, "www.example.org." The webpage data may include data that specifies where indicia appear on first-party webpage 206, such as text 208. In some implementations, the webpage data may also include additional URL information used by web browser 200 to retrieve additional indicia displayed on first-party webpage 206. For example, the file, "weather.html," may also include one or more instructions used by processor 112 to retrieve images 210-216 from their respective content sources.

Web browser 200 may include a number of navigational controls associated with first-party webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of first-party webpage 206 that are currently off-screen. For example, first-party webpage 206 may be formatted to be larger than the screen of electronic display 116. In such a case, the one or more scroll bars 220 may be used to change the vertical and/or horizontal position of first-party webpage 206 on electronic display 116.

First-party webpage 206 may be devoted to one or more topics. For example, first-party webpage 206 may be devoted to the local weather forecast for Freeport, Me. In some implementations, a content selection server, such as content selection service 104, may analyze the contents of first-party webpage 206 to identify one or more topics. For example, content selection service 104 may analyze text 208 and/or images 210-216 to identify first-party webpage 206 as being devoted to weather forecasts. In some implementations, webpage data for first-party webpage 206 may include metadata that identifies a topic.

In various implementations, content selection service 104 may select some of the content presented on first-party webpage 206 (e.g., an embedded image or video, etc.) or in conjunction with first-party webpage 206 (e.g., in a pop-up window or tab, etc.). For example, content selection service 104 may select third-party content 218 to be included on webpage 206. In some implementations, one or more content tags may be embedded into the code of webpage 206 that defines a content field located at the position of third-party content 218. Another content tag may cause web browser 200 to request additional content from content selection service 104, when first-party webpage 206 is loaded. Such a request may include one or more keywords, a device identifier for client device 102, or other data used by content selection service 104 to select content to be provided to client device 102. In response, content selection service 104 may select third-party content 218 for presentation on first-party webpage 206.

According to various implementations, one or more content tags included in the webpage code for webpage 206 may cause web browser 200 to report location information to the content selection service as part of a content selection request. In some cases, an embedded script on webpage 206 may cause web browser 200 to access an application programming interface (API) of another application that determines the location of client device 102. For example, web browser 200 may relay location information to content selection service 104 via an API of a navigation program executed by client device 102. In further cases, web browser 200 may itself determine the location of client device 102 (e.g., web browser 200 may be configured to access location-determining hardware of client device 102). In yet another case, the location information reported by web browser 200 may be a network address or network access point that is used by content selection service 104 to determine a location of client device 102. For example, content selection service 104 may use a received IP address or a known WiFi hotspot to identify the location of client device 102.

Content selection service 104 may select third-party content 218 (e.g., an advertisement) by conducting a content auction, in some implementations. Content selection service 104 may also determine which third-party content providers compete in the auction based in part on account parameters set by the providers. For example, only content providers that specified a topic that matches that of webpage 206, an interest category of a device identifier accessing webpage 206, or a location associated with client device 102 may compete in the content auction. Based on bidding parameters for these third-party content providers, content selection service 104 may compare their bid amounts, quality scores, and/or other values to determine the winner of the auction and select third-party content 218 for presentation with webpage 206.

According to various implementations, a location associated with client device 102 may be used by content selection service 104 to determine which third-party content providers participate in a content auction and/or to determine the bids of the auction participants. In one implementation, a third-party content provider may not even submit an auction bid if the location of client device 102 is outside of a specified geographic area (e.g., an advertiser may specify that he only wishes to advertise to devices located in California). In a further implementation, the submitted bid may be a function of a location-based bid modifier (e.g., a base bid may be adjusted upward if the user is located in or near the establishment of the content provider). In a further implementation, a bid modifier may be adjusted based in part on a travel value that defines a relationship between the location of client device 102 and a physical establishment of the content provider (e.g., a travel time, a travel distance, etc.). For example, content selection service 104 may generate a higher bid on behalf of a content provider if client device 102 is close to provider's establishment than if client device 102 is farther away from the establishment. In other words, one or more location-based bid modifiers may be used to determine the auction bid submitted on behalf of a third-party content provider for the ability to place content in the location of third-party content 218.

In the example shown, assume that client device 102 is located several blocks away from the physical establishment, "The Local Burger Stand," which is located at 3 Main Street. Also, assume that the proprietor of the restaurant has created an account with content selection service 104 to advertise the restaurant. As part of the account, the proprietor of the restaurant accept a suggested bid modifier value that increases his auction bids by 50% for client devices that are located within half of a mile of the restaurant. The resulting auction bid may then be used by content selection service 104 to determine that the proprietor of the restaurant has won the content auction and select third-party content 218 (e.g., an advertisement for the restaurant) for presentation on webpage 206.

In some implementations, content selection service 104 may provide third-party content 218 directly to client device 102. In other implementations, content selection service 104 may send a command to client device 102 that causes client device 102 to retrieve third-party content 218. For example, the command may cause client device 102 to retrieve third-party content 218 from a local memory, if third-party content 218 is already stored in memory 114, or from a networked content source. In this way, any number of different pieces of content may be placed in the location of third-party content 218 on first-party webpage 206. In other words, one user that visits first-party webpage 206 may be presented with third-party content 218 and a second user that visits first-party webpage 206 may be presented with different content. Other forms of content (e.g., an image, text, an audio file, a video file, etc.) may be selected by content selection service 104 for display with first-party webpage 206 in a manner similar to that of third-party content 218. In further implementations, content selected by content selection service 104 may be displayed outside of first-party webpage 206. For example, content selected by content selection service 104 may be displayed in a separate window or tab of web browser 200, may be presented via another software application (e.g., a text editor, a media player, etc.), or may be downloaded to client device 102 for later use.

Figure 3:
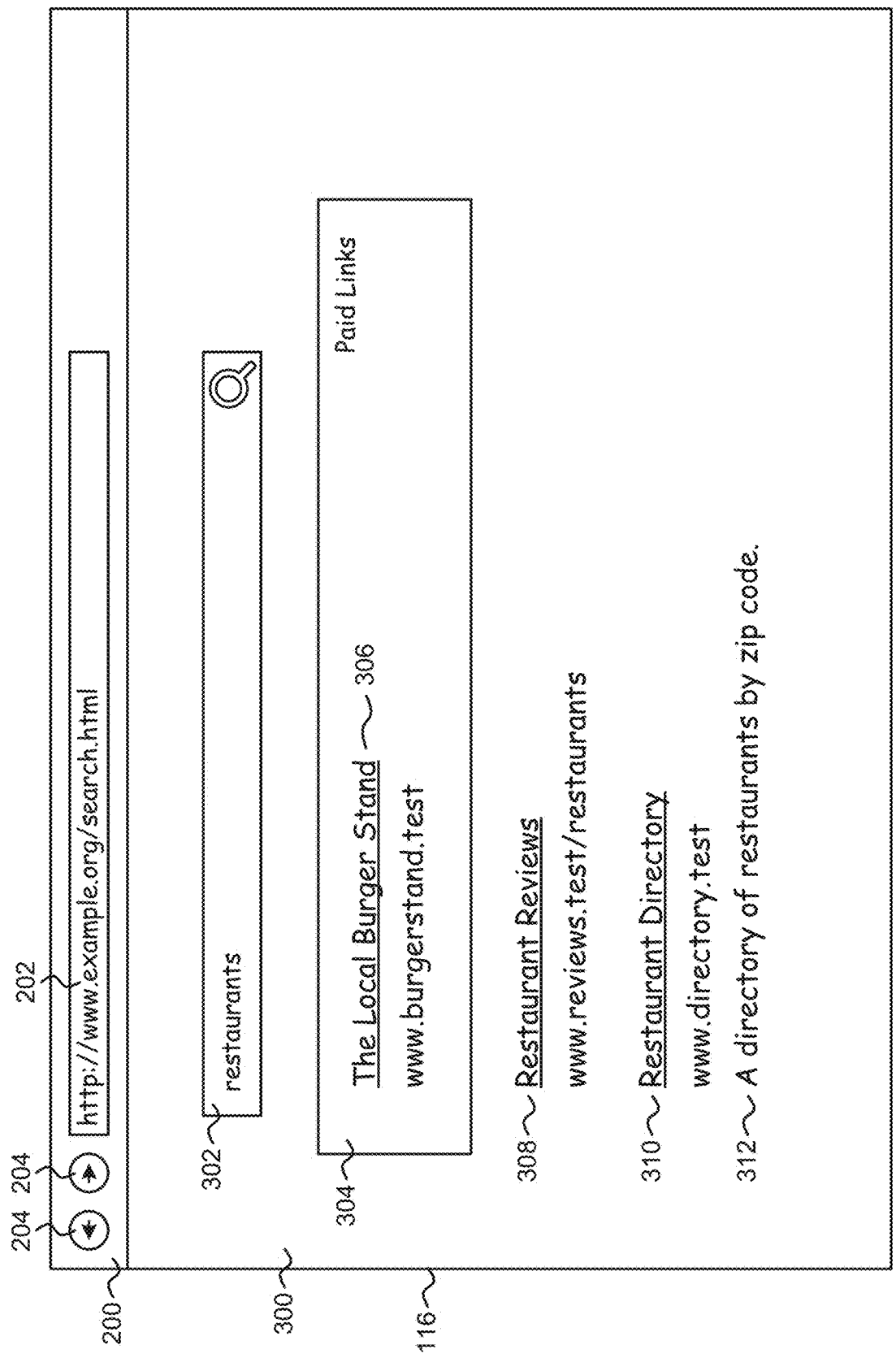
FIG. 3 is an illustration of an electronic display showing first-party search results with third-party content.

Referring now to FIG. 3, an illustration is shown of electronic display 116 showing first-party search results with third-party content. Similar to webpage 206 in FIG. 2, client device 102 may access a first-party search engine via network 106 by executing a web browser 200. In other implementations, the search engine may provide search results for display by client device 102 within a stand-alone application. For example, a navigation application executed by client device 102 may include a search feature that allows search results from the search engine to be presented within the application.

As shown, the first-party search engine accessed by client device 102 may provide a webpage 300 to client device 102 that is configured to allow for searches and search results to be updated on the fly. For example, webpage 300 may include a search field 302 that receives a search query and webpage 300 may also display search results obtained using the query. In other implementations, search field 302 may be displayed separately from the search results (e.g., search field 302 and the search results may appear on different webpages, screens, etc.). Search field 302 is generally configured to receive one or more search terms to be searched by the search engine. For example, the search term "restaurants" may be entered into search field 302 and used to search for links to online resources devoted to restaurants. A search query may be entered into search field 302 via a touch screen display, keyboard, a microphone (e.g., via voice recognition), or another user interface device of client device 102.

In response to receiving the search query entered into search field 302, the search engine may retrieve any number of links to websites or other online services regarding the query. For example, the search engine may retrieve the URLs of websites devoted to the topic of restaurants and provide them as hyperlinks 308, 310 on webpage 300 as search results. In some implementations, the search engine may maintain an index of keywords used on webpages or other resources. Search results may then be ordered by the search engine based on the relevancy of the indexed webpages relative to the search query. A summary of the webpage or other resource may also be provided on webpage 300 by the search engine. For example, hyperlink 310 may have an associated description 312 that gives more detail about the linked webpage. Since hyperlinks 308, 310 are presented as search results based solely on their relevancy to the search query, they may be considered first-party content.

In addition to webpage 300 including hyperlinks 308, 310 as search results, webpage 300 may also include third-party content 304 selected by content selection service 104. Third-party content 304 may be, in one example, a hyperlink 306 to a third-party content provider's website. Third-party content 304 may also identify itself as being third-party content, such as including a notification that the hyperlink is a paid link. Other forms of third-party content that may be presented in conjunction with search results may include a location (e.g., the location of the nearest restaurant to client device 102) or links to perform online actions, such as playing a piece of media content.

Content selection service 104 may conduct a content auction to select third-party content 304. In response to the search query entered into search field 302, content selection service 104 may first determine which third-party content providers are to compete in a content auction. For example, only third-party content providers that specify the search term "restaurants" may participate in the content auction. Another parameter may also be used to control which third-party content providers participate in the auction includes the geographic location of client device 102. Such a geographic location may correspond to a particular city, zip code, state, country, or other area. For example, a third-party advertiser located in Great Britain may only be interested in advertising to client devices located there and not in the United States of America.

According to various implementations, a location-based bid modifier may be used by content selection service 104 to generate a content auction bid on behalf of a third-party content provider. The bid modifier may adjust a base bid of a third-party content provider up or down based on a travel value that relates the location of client device 102 to a physical establishment of the content provider. For example, a base bid amount of $1 may be adjusted by +50% (e.g., to a final bid of $1.50) if client device 102 is within one mile of the nearest establishment of the third-party content provider. In another example, the base bid amount may be adjusted upward if client device 102 is determined to be within five minutes travel of the provider's physical establishment. As shown, for example, third-party content 304 may be an advertisement for the restaurant, "The Local Burger Stand" if the bid modifier used by the proprietor of the restaurant and the distance between client device 102 and the restaurant are such that the proprietor has won the content auction.

Figure 4:
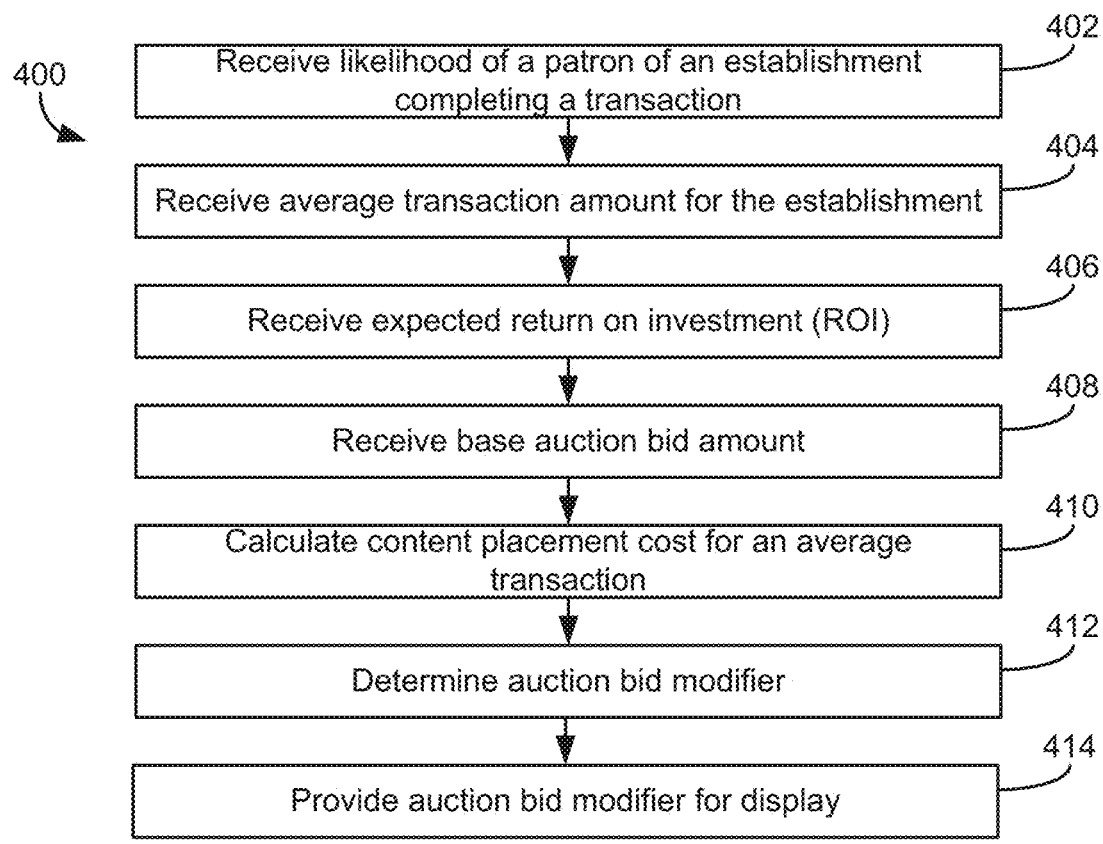
FIG. 4 is a flow diagram of one implementation of a process for suggesting a location-based bid modifier.

Referring now to FIG. 4, a flow diagram is shown of one implementation of a process 400 for suggesting a location-based bid modifier. As shown, process 400 includes receiving data indicative of a likelihood of a patron of a physical establishment completing a transaction (step 402), receiving an average transaction amount for the establishment (step 404), receiving an expected ROI (step 406), receiving a base auction bid amount (step 408), calculating a content placement cost for an average transaction (step 410), determining a location-based auction bid modifier (step 412), and providing the bid modifier for display (step 414). Process 400 may be implemented by one or more computing devices, such as content selection service 104 shown in FIG. 1. In general, process 400 allows a third-party content provider, such as an advertiser, to determine a location-based bid modifier for use in a content auction.

Still referring to FIG. 4 and in more detail, process 400 includes receiving data indicative of a likelihood of a patron of an establishment completing a transaction at the establishment (step 402). A transaction may be any form of action performed by a visitor to the establishment that is desired by the third-party content provider. For example, a transaction may be, but is not limited to, a patron of the establishment making a purchase, signing a lease agreement, signing up for a marketing list, signing up for a membership, voting, donating blood, or performing any other action that may be desired by the third-party content provider. For example, an online advertiser may specify to a content selection service that, on average, 80% of the visitors to the advertiser's physical store complete a purchase. The received likelihood may correspond to any time period or multiple time periods, in various implementations. For example, the received likelihood of a completed transaction may be an overall average for the content provider or for a specific time period. In another example, the likelihood of a completed transaction at the establishment may be higher during a holiday or sales event than during other time periods. In such a case, multiple likelihood values may be received corresponding to the different time periods. In some cases, the received data may include the raw data used by content selection service 104 to calculate the likelihood value such as the raw number of visitors to the establishment and the number of completed transactions.

Yet still referring to FIG. 4, process 400 includes receiving data indicative of an average transaction amount for the establishment (step 404). An average transaction amount may be a dollar amount associated with a completed transaction or any other amount that quantifies the value of a completed transaction to the third-party content provider. For example, a furniture retailer may specify that the average transaction amount at her retail location is $2,500 while the proprietor of a hamburger stand may specify that the average transaction amount at his restaurant is $5.

Still referring to FIG. 4, process 400 includes receiving data indicative of an expected ROI (step 406). In general, the specified ROI may correspond to a difference between an amount spent by a content provider to place third-party content and an expected transaction amount that resulted from the placement. For example, the specified ROI may correspond to the following:

$$ROI = \frac{Expected\_Revenues}{Cost}$$

where Expected Revenues is an expected transaction amount that would result from a placement of third-party content and Cost is the cost of the placement. For example, if an advertiser spends $0.50 to place an advertisement and the advertisement results in a $5 purchase, the ROI of the provider is $4.50. In some implementations, the expected transaction amount may be based on an average transaction amount for the establishment combined with a probability of a patron of the establishment completing a transaction.

Yet still referring to FIG. 4, process 400 includes receiving data indicative of a base auction bid amount (step 408). In various implementations, the base bid amount may correspond to a bid amount that a content provider is willing to pay to place content on a client device, regardless of the location of the client device. For example, a content provider may be willing to pay $1 to place an advertisement on a mobile device, regardless of the location of the mobile device. Another location-based content selection parameter may also control whether or not the base bid amount is even submitted on behalf of a content provider. For example, a content provider may set a parameter that specifies that advertisements are to be provided to devices located in California only and a base bid of $1 to advertise to devices in California, regardless of their proximity to the provider's establishment. In one implementation, the base bid amount may take into account other non-location based content selection parameters. For example, the base bid amount may correspond to an amount an advertiser is willing to bid if the client device is a mobile device that runs a particular operating system.

Yet still referring to FIG. 4, process 400 includes calculating a content placement cost for an average transaction (step 410). In various implementations, the content placement cost may correspond to the amount of money that a third-party content provider agrees to pay a content selection service for the ability to provide the provider's content to a client device. For example, the content placement cost may be a content auction bid amount used by the content selection service to select the provider's content for placement at a client device. In one implementation, the content placement cost may be calculated using the data indicative of the likelihood of a completed transaction, the average transaction amount, and the expected ROI received in steps 402-406. For example, the content placement cost may be calculated by solving the following:

$$Cost = \frac{A * p}{ROI}$$

where A is the average transaction amount for the content provider's establishment, p is the probability of a visitor to the establishment completing a transaction, and ROI is the provider's expected ROI for providing third-party content via the content selection service.

Still referring to FIG. 4, process 400 includes determining a bid modifier (step 412). In various implementations, a bid modifier ($\beta$) may be determined using the cost calculated in step 410 as follows:

$$\beta = \frac{Cost}{Bid} - 1$$

where Cost is the ROI-dependent cost and Bid is the base auction bid received in step 408. The bid modifier is location-based in that it assumes a 100% probability of the user visiting the physical establishment (e.g., the user is already located in or near the establishment). For example, assume that the average transaction at an establishment is $5, that 90% of visitors to the establishment complete a transaction, that the advertiser has an expected ROI of $4, and that the advertiser wishes to place a base bid of $1. In such a case, the actual cost of a content placement to the advertiser is $1.125 and the bid modifier is 0.125 or 12.5%.

In other words, the advertiser should increase her base bid by 12.5% (e.g., for a final bid amount of $1.125) to achieve her expected ROI.

Still referring to FIG. 4, process 400 includes providing the bid modifier for display (step 414). In various implementations the bid modifier determined in step 412 may be provided to a computing device associated with the third-party content provider. For example, the content selection service may suggest that a content provider increase his or her base bids by 12.5% for certain devices. In one implementation, the content selection service may prompt the provider to accept the bid modifier before using the calculated value. In another implementation, the content selection service may automatically use the bid modifier in future content auctions and provide a notification to the content provider.

As noted previously, a bid modifier calculated via process 400 may correspond to a client device that has a 100% probability of visiting the physical establishment of the content provider. For example, the bid modifier determined via process 400 may be used for client devices that are located in or near the establishment. In some implementations, the bid modifier calculated via process 400 may be adjusted further based on a travel value. For example, one or more bid modifier values may be calculated by multiplying the bid modifier from process 400 by a probability that a user will visit the provider's establishment. The probability of a visit may be a function of the amount of travel time to the establishment by the device, the distance along a path separating the device and the establishment, a direct distance separating the establishment and the device, or any other travel value that relates the location of the device to the location of the establishment. In one implementation, the probability of a visit to the establishment may be modeled using a discrete, exponential decay function. For example, the probability of a user visiting the physical establishment of a third-party content provider may be treated as 100% within one mile of the establishment, 80% if the user is between one mile and five miles of the establishment, etc., up to a maximum travel value threshold specified by the third-party content provider.

In some cases, a client device may be located within a predefined travel value range to multiple establishments of the content provider. In one implementation, the content selection service may determine a bid modifier for each of the establishments within the travel value range and select the highest bid modifier for use. For example, assume that the client device is located five miles away from the nearest restaurant of the content provider and twenty miles away from the next closest restaurant of the provider. Also, assume that the content provider specifies that a typical user is willing to drive up to 50 miles to eat at one of the provider's restaurants. In such a case, the calculated bid modifier for the closer restaurant may be higher and the selection service may use the modifier to generate the finalized auction bid. In another implementation, the content selection service may select the establishment with the lowest travel value for analysis. In yet another implementation, the content selection service may take into account other factors in the comparison, such as whether the user typically visits one of the two establishments, drives by one of the two establishments, etc.

Figure 5:
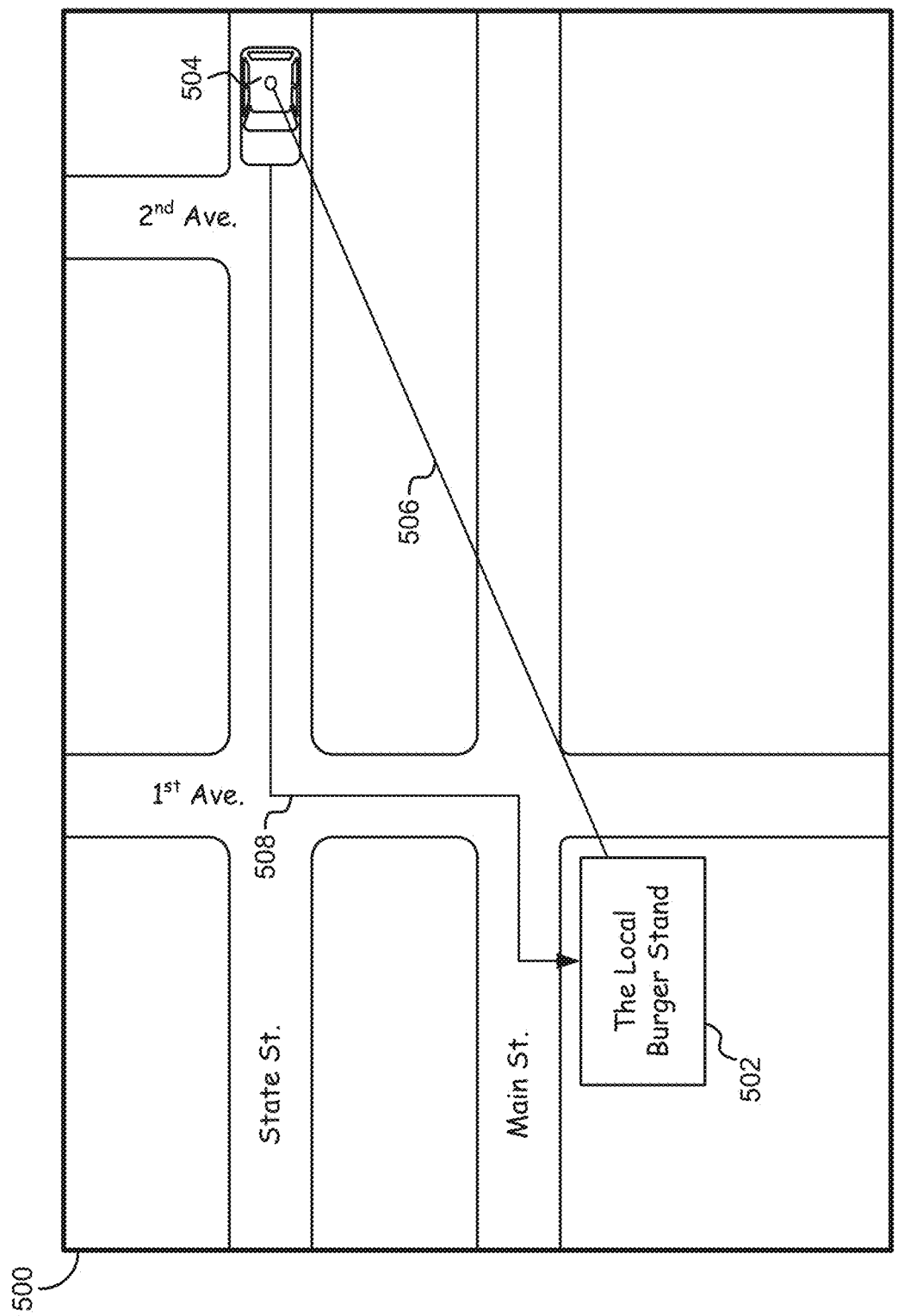
FIG. 5 is an illustration is shown of the location of a client device relative to that of a physical establishment, according to various implementations.

Referring now to FIG. 5, an illustration is shown of the location of a client device relative to that of a physical establishment, according to various implementations. As shown, a client device may be located at location 504 and a physical establishment may be located at location 502. According to various implementations, the client device located at location 504 may report its location to a content selection service as part of a content selection request. For example, assume that client device 102 shown in FIG. 1 is located at location 504. In such a case, client device 102 may provide data indicative of location 504 to content selection service 104 as part of a request for third-party content.

According to various implementations, a content selection service may determine a travel value using the location data received from the client device located at location 504. In general, the travel value may be any value that relates locations 502 and 504. In one implementation, the travel value may be a function of a radius 506 (e.g., a direct distance value) separating locations 502 and 504. In another implementation, the travel value may be a distance along a path 508 that separates locations 502 and 504. For example, path 508 may correspond to the path that the user located at location 504 may actually travel to arrive at the establishment located at location 504. Path 508 may be determined as a shortest path or may also take into account other factors, such as one-way streets, traffic, and other such factors that may affect how a user is likely to travel to location 502. In some implementations, the content selection service may determine a mode of transportation for the client device and use this information to determine path 508. For example, the content selection service may determine that the client device is traveling in an automobile based on its velocity and/or location (e.g., in the middle of the street). Other forms of transportation that may be determined by the content selection service may include walking, public transportation (e.g., busses, trains, etc.), or the like.

In some implementations, the travel value determined by the content selection service may be a travel time relating locations 504 and 502. For example, the content selection service may estimate the amount of time that it would take an automobile at location 504 to travel along path 506 to arrive at the establishment located at location 502. If a temporal travel value is used, the travel value may be based in part on a determined mode of transportation (e.g., walking vs. driving, etc.) and/or other factors that may affect the travel time (e.g., traffic, detours, etc.).

The content selection service may use a travel value that relates locations 504 and 502 to determine a probability of the user located at location 504 visiting the physical establishment located at location 502 after viewing third-party content associated with the establishment. For example, content selection service 104 shown in FIG. 1 may determine the probability of the user of client device 102 located at location 504 visiting the restaurant at location 502 after viewing an advertisement for "The Local Burger Stand." In various implementations, the visit probability may be modeled as a decay function, such as an exponential decay function, a linear decay function, or any other decay function in which the probability of a visit decreases as the travel value increases. In one implementation, the decay function may also be a discrete function in which ranges of travel values are assigned the same visit probability. For example, the visit probability may be 80% if the client device at location 504 is between ten and twenty miles away from location 502.

According to various implementations, a visit probability determined by a content selection service may be used by the service to determine a bid modifier. For example, assume that the service has calculated a bid modifier of +20%, assuming that the client device is located at location 504 (e.g., the user is already in the establishment). Thus, the calculated bid modifier may be at a maximum since there is a 100% probability of the user visiting the establishment. However, if the location of the client device does not match that of the physical establishment of the content provider, or is outside of a certain range, the content selection service may adjust the bid modifier using the visit probability. For example, assume that the travel distance along path 508 is 0.75 miles and that the associated probability of a visit at this distance is 85%. In such a case, the content selection service may adjust the maximum bid modifier downward to reflect the lower probability of a visit. For example, the overall bid modifier may be 85%*+20%=+14.45%, which may be used by the service to increase the base bid of the content provider associated with the establishment at location 502.

Referring now to FIG. 6, an illustration is shown of one implementation of an electronic display presenting a suggested bid modifier. As shown, an interface screen 600 may prompt a user associated with a third-party content provider for certain information used to determine a suggested bid modifier. In one implementation 600 may be used to modify an account of the third-party content provider with a content selection service.

Interface screen 600 may include one or more inputs 602 for the location or locations of the content provider's physical establishments. For example, "The Local Burger Stand" may be located at 3 Main Street, Anywhere U.S.A. In other implementations, interface screen 600 may employ other input mechanism to receive multiple locations. For example, interface screen 600 may include multiple input boxes, a selectable map, a mechanism to upload a file (e.g., a text file, spreadsheet, or other file containing establishment locations), or other inputs to enter the locations of a content provider's physical establishments.

Interface screen 600 may include an input 612 configured to receive a maximum travel value. In some implementations, interface screen 600 may also include an input 614 configured to receive a travel value type, if the content selection service supports multiple travel values. For example, the third-party content provider may specify via inputs 612, 614 that a typical user is willing to travel up to ten miles to the provider's physical establishment located at 3 Main Street. Other example travel value types that may be selected via input 614 may include, but are not limited to, direct distances, distances along a travel path, travel times, or the like. In various implementations, the content selection service may use the inputs received via inputs 602, 612, and 614 to model a probability of a user visiting the location specified via input 602. For example, the travel value received via input 612 may be associated with a minimum visit probability, the location received via input 602 may be associated with a maximum visit probability, and one or more probabilities there between may be modeled as a function of the travel value.

Interface screen 600 may include various inputs 604-610 that request information regarding the business of the third-party content provider. In one implementation, input 604 may be configured to request an average transaction amount at the physical establishment specified via input 602. Input 606 may be configured to receive a value that represents the likelihood of a visitor to the establishment completing a transaction (e.g., a probability or other value). Input 608 may be configured to receive a base bid amount that the third-party content provider wishes to use for devices located outside of the maximum travel value specified via input 612. Input 610 may be configured to receive an expected ROI of the third-party content provider that would result from the placement of the provider's third-party content.

Interface screen 600 may include an input 618 configured to cause the content selection service to calculate one or more bid modifiers, when selected. For example, interface screen 600 may display a set 620 of one or more bid modifiers that are based in part on the data received via inputs 604-610. In some implementations, the content selection service may use a visit probability function to determine multiple bid modifier values. For example, a discrete visit probability model may have probabilities corresponding to different distance ranges in set 622 shown on interface screen 600. The visit probabilities associated with the different travel ranges in set 622 may be used to determine overall bid modifiers 624-634 that are functions of the travel distances. For example, bid modifier 624 may correspond to the maximum visit probability (e.g., the user may be the most likely to visit the establishment when located within a mile of the establishment). Similarly, bid modifier 634 may indicate that the base bid amount specified via input 608 is suggested for use when the client device is located more than ten miles from the physical establishment. For example, the content provider may still wish to advertise to users located outside of the maximum travel distance, but only use a base bid amount since the advertisement is unlikely to prompt the user to visit the establishment immediately. In between bid modifiers 624 and 634 may be any number of other bid modifiers that represent a sliding scale of visit probabilities that vary with the travel distance. For example, bid modifier 626 may correspond to an 80% visit probability while bid modifier 632 may correspond to a 10% visit probability.

Bid modifiers 624-634 may be processed in a number of ways by the content selection service. In one implementation, the content selection service may automatically apply bid modifiers 624-634 to the entire account of the content provider, a campaign of the content provider, a content group (e.g., one or more pieces of third-party content) of the content provider, or to a specific piece of third-party content of the provider. In another implementation, the content selection service may allow the third-party content provider to confirm the use of one or more of bid modifiers 624-634. For example, the content provider may elect to use bid modifier 624 when the client device is located within one mile of the provider's establishment, but may elect not to use bid modifiers 626-630 at all. In yet another implementation, only bid modifier 624 may be presented to the third-party content provider and interface screen 600 may indicate that the bid modifier will be adjusted downward as the travel value increases.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In further implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system for dynamic location-based selection of online content, comprising:
   memory and one or more processors;
   a content selection service executed by the one or more processors to:
   receive a search query identified from voice input detected by a microphone of a client device;
   identify, responsive to the search query and based on data received from location hardware configured on the client device, a location of the client device;
   determine, based on the location input into a function comprising a minimum probability value at a maximum travel value for a physical establishment, a probability that a user of the client device visits the physical establishment with the client device;
   generate, responsive to at least one of a request for content and the search query, a bid modifier based on a first product of the probability that the client device visits the physical establishment and an average transaction amount for the physical establishment divided by a second product of an expected amount for one or more transactions made at the physical establishment that resulted from placement of third-party content and a base bid amount established by a content provider;
   select, via a content selection process based on the bid modifier in response to the at least one of the request for content and the search query, an online content item comprising audio for the physical establishment; and
   provide, via a network to the client device, the online content item comprising the audio selected based on the bid modifier to cause the client device to present the online content item via an interface of the client device.

2. The system of claim 1, comprising:
   the content selection service to receive the search query identified with voice recognition applied to the voice input detected by the microphone of the client device.

3. The system of claim 1, wherein the interface comprises a speaker, comprising:
   the content selection service to provide the online content item comprising the audio to cause the client device to present at least a portion of the online content item via the speaker.

4. The system of claim 1, wherein the interface comprises a speaker connected to the client device.

5. The system of claim 1, wherein the client device comprises a digital assistant, and the voice input comprises speech.

6. The system of claim 1, wherein the voice input comprises acoustic input.

7. The system of claim 1, wherein the online content item comprises an audio file.

8. The system of claim 1, comprising:
   the content selection service to determine, based on the location of the client device, a travel value for the physical establishment that indicates a spatio-temporal relationship between the location of the client device and the physical establishment of a third-party content provider.

9. The system of claim 8, wherein the travel value comprises at least one of:
   a radius around the physical establishment;
   a travel time to the physical establishment; or
   a distance along a path to the physical establishment.

10. The system of claim 1, wherein the function comprises an exponential decay function.

11. A method of location-based selection of online content, comprising:
   receiving, by a content selection service executed by one or more processors of one or more servers, a search query identified from voice input detected by a microphone of a client device;

identifying, by the content selection service responsive to the search query and based on data received from location hardware configured on the client device, a location of the client device;

determining, by the content selection service based on the location input into a function comprising a minimum probability value at a maximum travel value for a physical establishment, a probability that a user of the client device visits the physical establishment with the client device;

generating, by the content selection service responsive to at least one of a request for content and the search query, a bid modifier based on a first product of the probability that the client device visits the physical establishment and an average transaction amount for the physical establishment divided by a second product of an expected amount for one or more transactions made at the physical establishment that resulted from placement of third-party content and a base bid amount established by a content provider;

selecting, by the content selection service via a content selection process based on the bid modifier in response to the at least one of the request for content and the search query, an online content item comprising audio for the physical establishment; and providing, by the content selection service via a network to the client device, the online content item comprising the audio selected based on the bid modifier to cause the client device to present the online content item via an interface of the client device.

12. The method of claim 11, comprising:
receiving the search query identified with voice recognition applied to the voice input detected by the microphone of the client device.

13. The method of claim 11, wherein the interface comprises a speaker, comprising:
providing the online content item comprising the audio to cause the client device to present at least a portion of the online content item via the speaker.

14. The method of claim 11, wherein the interface comprises a speaker connected to the client device.

15. The method of claim 11, wherein the client device comprises a digital assistant, and the voice input comprises speech.

16. The method of claim 11, wherein the voice input comprises acoustic input.

17. The method of claim 11, wherein the online content item comprises an audio file.

18. The method of claim 11, comprising:
determining, by the content selection service based on the location of the client device, a travel value for the physical establishment that indicates a spatio-temporal relationship between the location of the client device and the physical establishment of a third-party content provider.

19. The method of claim 18, wherein the travel value comprises at least one of:
a radius around the physical establishment;
a travel time to the physical establishment; or
a distance along a path to the physical establishment.

20. The method of claim 11, wherein the function comprises an exponential decay function.

* * * * *